United States Patent
Kim et al.

(10) Patent No.: US 12,517,078 B2
(45) Date of Patent: Jan. 6, 2026

(54) APPARATUS AND METHOD FOR CORRECTING REFERENCE POTENTIAL OF ELECTROCHEMICAL SENSOR

(71) Applicant: I-SENS, INC., Seoul (KR)

(72) Inventors: Su Jin Kim, Seoul (KR); Jeong Yeon Choi, Seoul (KR); In Seok Jeong, Seoul (KR); Young Jea Kang, Seoul (KR)

(73) Assignee: I-SENS, INC., Seoul (KR)

( * ) Notice: Subject to any disclaimer, the term of this patent is extended or adjusted under 35 U.S.C. 154(b) by 183 days.

(21) Appl. No.: 18/288,436

(22) PCT Filed: Mar. 11, 2022

(86) PCT No.: PCT/KR2022/003442
§ 371 (c)(1),
(2) Date: Oct. 26, 2023

(87) PCT Pub. No.: WO2022/231123
PCT Pub. Date: Nov. 3, 2022

(65) Prior Publication Data
US 2024/0210348 A1    Jun. 27, 2024

(30) Foreign Application Priority Data
Apr. 29, 2021 (KR) .................. 10-2021-0055522

(51) Int. Cl.
*G01N 27/30* (2006.01)
*G01N 27/416* (2006.01)

(52) U.S. Cl.
CPC ....... *G01N 27/301* (2013.01); *G01N 27/4163* (2013.01)

(58) Field of Classification Search
CPC ............ G01N 27/301; G01N 27/4163; G01N 27/3274
See application file for complete search history.

(56) References Cited

U.S. PATENT DOCUMENTS

| 2003/0188977 | A1 | 10/2003 | Chalyt et al. |
| 2009/0288949 | A1 | 11/2009 | Yeon et al. |

(Continued)

FOREIGN PATENT DOCUMENTS

| GB | 2460130 A | 11/2009 |
| JP | 2007-255906 A | 10/2007 |

(Continued)

OTHER PUBLICATIONS

Centre Français De L'Anticorrosion—Committee for Cathodic Protection and Associated Coatings, "Recommendations for the verification of reference electrodes", Recommendation PCRA 005, Mai 2007—Rev. 1 (Year: 2007).*

(Continued)

*Primary Examiner* — Alexander S Noguerola
(74) *Attorney, Agent, or Firm* — PLEECHAE IP, LLC

(57) ABSTRACT

An apparatus for correcting a reference potential according to an aspect includes a current-voltage graph obtaining unit configured to apply a voltage to both ends of each of an operating electrode and a reference electrode of an electrochemical sensor at a first time point and a second time point to obtain a first voltage-current graph and a second voltage-current graph and a potential correction unit configured to determine a degree of change in the reference potential of the reference electrode based on the first voltage-current graph and the second voltage-current graph.

15 Claims, 6 Drawing Sheets

(56) References Cited

U.S. PATENT DOCUMENTS

2019/0376927 A1   12/2019   Gahlings et al.
2020/0264123 A1    8/2020   Gahlings et al.

FOREIGN PATENT DOCUMENTS

JP          2019-219407 A    12/2019
KR          10-0612270 B1     8/2006
KR       10-2009-0121539 A   11/2009
KR          10-1611233 B1     4/2016

OTHER PUBLICATIONS

OrigaLys—Ap[plication Note—General Electrochemistry AP-GE11, "Verification of Reference electrode through OCP method," Feb. 28, 2021 (Year: 2021).*
Based on an English language translation obtained by the U.S. Examiner, of the Written Opinion for international application PCT/KR222/003442, mailed Jun. 22, 2022 (Year: 2022).*
EPO machine-genertaed English language translation of JP 2007-255906 A , patent published 2007.10.4 (Year: 2007).*
European Search Report for EP22795957.4 issued on Jul. 31, 2024 from European patent office in a counterpart European patent application.
International Search Report for PCT/KR2022/003442 mailed on Jun. 22, 2022.

* cited by examiner

APPARATUS AND METHOD FOR CORRECTING REFERENCE POTENTIAL OF ELECTROCHEMICAL SENSOR

CROSS REFERENCE TO RELATED APPLICATIONS AND CLAIM OF PRIORITY

This application claims benefit under 35 U.S.C. 119, 120, 121, or 365 (c), and is a National Stage entry from International Application No. PCT/KR2022/003442 filed on Mar. 11, 2022, which claims priority to the benefit of Korean Patent Application No. 10-2021-0055522 filed in the Korean Intellectual Property Office on Apr. 29, 2021, the entire contents of which are incorporated herein by reference.

BACKGROUND

1. Technical Field

The present invention relates to an apparatus and a method for correcting a reference potential of an electrochemical sensor.

2. Background Art

In order to accurately apply a potential to an operating electrode and adjust the same in an electrochemical method, it is essential to use a reference electrode. In general, the most commonly used reference electrode in research and industry fields is a silver/silver chloride electrode or a calomel electrode. These electrodes use the characteristic that the activity of chlorine ions in an electrolyte inside the electrode is constant, and therefore, the concentration of chlorine ions inside the electrode should be constantly maintained during measurement.

However, when there is no internal electrolyte to constantly maintain the chlorine ions, if a change in the concentration of the chlorine ions occurs due to accumulation or loss of the chlorine ions, the reference potential of the reference electrode may be gradually changed, which may act as a factor to cause a deterioration in the performance thereof.

SUMMARY

It is an object of the present invention to provide an apparatus and a method, which may correct a change in a reference potential of an electrochemical sensor using voltammetry.

To achieve the above object, according to an aspect of the present invention, there is provided an apparatus for correcting a reference potential for an electrochemical sensor including: a current-voltage graph obtaining unit configured to apply a voltage to both ends of each of an operating electrode and a reference electrode of an electrochemical sensor at a first time point and a second time point to obtain a first voltage-current graph and a second voltage-current graph; and a potential correction unit configured to determine a degree of change in the reference potential of the reference electrode based on the first voltage-current graph and the second voltage-current graph.

The first time point may be an initial time of use of the electrochemical sensor without a change in the reference potential, and the second time point may be a time point after a predetermined period of time has elapsed from the first time point.

The current-voltage graph obtaining unit may obtain the first voltage-current graph and the second voltage-current graph using any one of linear sweep voltammetry, cyclic voltammetry, normal pulse voltammetry, differential pulse voltammetry and square wave voltammetry.

The potential correction unit may extract feature values from the first voltage-current graph and the second voltage-current graph, and compare the extracted feature values to determine the degree of change in the reference potential.

The feature value may include a voltage at a current peak point, a voltage at a start point of current increase, a voltage at a start point of current decrease, a voltage at a maximum rising gradient point, and a voltage at a maximum falling gradient point.

The potential correction unit may determine a difference between the feature value extracted from the first voltage-current graph and the feature value extracted from the second voltage-current graph as the degree of change in the reference potential.

The potential correction unit may generate a reference potential correction signal according to the determined degree of change in the reference potential, and transmit it to the electrochemical sensor.

In addition, according to another aspect of the present invention, there is provided an electrochemical sensor including the above-described apparatus for correcting a reference potential.

Further, according to another aspect of the present invention, there is provided a method for correcting a reference potential of an electrochemical sensor including: applying a voltage to both ends of each of an operating electrode and a reference electrode of an electrochemical sensor at a first time point and a second time point to obtain a first voltage-current graph and a second voltage-current graph; and determining a degree of change in the reference potential of the reference electrode based on the first voltage-current graph and the second voltage-current graph.

The first time point may be an initial time of use of the electrochemical sensor without a change in the reference potential, and the second time point may be a time point after a predetermined period of time has elapsed from the first time point.

The step of obtaining the first voltage-current graph and the second voltage-current graph may obtain the first voltage-current graph and the second voltage-current graph using any one of linear sweep voltammetry, cyclic voltammetry, normal pulse voltammetry, differential pulse voltammetry and square wave voltammetry.

The step of determining the degree of change in the reference potential may extract feature values from the first voltage-current graph and the second voltage-current graph, and compare the extracted feature values to determine the degree of change in the reference potential.

The feature value may include a voltage at a current peak point, a voltage at a start point of current increase, a voltage at a start point of current decrease, a voltage at a maximum rising gradient point, and a voltage at a maximum falling gradient point.

The step of determining the degree of change in the reference potential may determine a difference between the feature value extracted from the first voltage-current graph and the feature value extracted from the second voltage-current graph as the degree of change in the reference potential.

The method for correcting a reference potential of an electrochemical sensor may further include generating a reference potential correction signal according to the determined degree of change in the reference potential, and transmitting it to the electrochemical sensor.

A change in the reference potential of an electrochemical sensor may be economically and easily corrected by using the voltammetry.

In addition, a deterioration in the performance of the electrochemical sensor may be prevented by periodically correcting the change in the reference potential.

DETAILED DESCRIPTION

Figure 1:
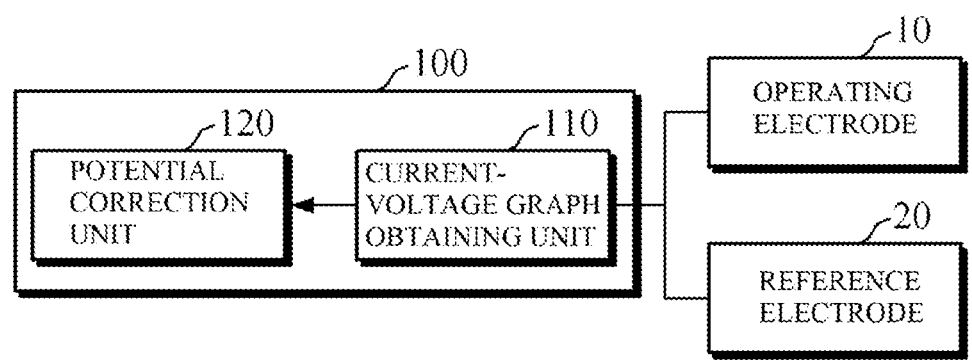
FIG. 1 is a block diagram illustrating an apparatus for correcting a reference potential according to an exemplary embodiment.

Hereinafter, embodiments will be described in detail with reference to the accompanying drawings. In denoting reference numerals to components of respective drawings, it should be noted that the same components will be denoted by the same reference numerals although they are illustrated in different drawings. Further, in description of preferred embodiments of the present invention, the publicly known functions and configurations related to the present invention, which are verified to be able to make the purport of the present invention unnecessarily obscure will not be described in detail.

Meanwhile, in respective steps, each of the steps may occur differently from the specified order unless a specific order is clearly described in the context. That is, each of the steps may be performed in the same order as the specified order, may be performed substantially simultaneously, or may be performed in the reverse order.

Further, wordings to be described below are defined in consideration of the functions in the present invention, and may differ depending on the intentions of a user or an operator or custom. Accordingly, such wordings should be defined on the basis of the contents of the overall specification.

It will be understood that, although the terms first, second, etc. may be used herein to describe various components, but these components should not be limited by these terms. These terms are used only to distinguish one component from other components. As used herein, the singular forms "a," "an" and "the" are intended to include the plural forms as well, unless the context clearly indicates otherwise. It will be further understood that the "includes" and/or terms "comprises," "comprising," "including," when used herein, specify the presence of stated features, integers, steps, operations, elements, and/or components, but do not preclude the presence or addition of one or more other features, integers, steps, operations, elements, components, and/or groups thereof.

In addition, a division of the configuration units in the present disclosure is intended for ease of description and divided only by the main function set for each configuration unit. That is, two or more of the configuration units to be described below may be combined into a single configuration unit or formed by two or more of divisions by function into more than a single configuration unit. Further, each of the configuration units to be described below may additionally perform a part or all of the functions among functions set for other configuration units other than being responsible for the main function, and a part of the functions among the main functions set for each of the configuration units may be exclusively taken and certainly performed by other configuration units. Each of the configuration units to be described below may be implemented as hardware or software, or may be implemented as a combination of hardware and software.

FIG. 1 is a block diagram illustrating an apparatus for correcting a reference potential according to an exemplary embodiment.

The apparatus for correcting a reference potential according to an exemplary embodiment may be an apparatus capable of correcting a change in a potential of a reference electrode (hereinafter referred to as a reference potential) of an electrochemical sensor. The apparatus for correcting a potential may be mounted on the electrochemical sensor and formed as a component of the electrochemical sensor, or may be wrapped in a housing and formed as a separate device.

Referring to FIG. 1, an apparatus for correcting a reference potential ("reference potential correction apparatus") 100 according to an exemplary embodiment may include a current-voltage graph obtaining unit 110 and a potential correction unit 120.

The current-voltage graph obtaining unit 110 may obtain voltage-current graphs by applying a voltage to both ends of each of an operating electrode 10 and a reference electrode 20. Here, the operating electrode 10 and the reference electrode 20 may be electrodes of an electrochemical sensor. The operating electrode 10 may be an electrode on which a reaction with a target material occurs, and the reference electrode 20 may be an electrode that serves as a reference when measuring or applying the voltage for electrochemical measurement. The operating electrode 10 may be formed of, for example, a material containing any one or two or more of metals, conductive non-metals, metal chlorides, metal oxides and metal sulfides. Further, the reference electrode 20 may be formed of, for example, silver/silver chloride (Ag/AgCl), calomel electrode ($Hg/Hg_2Cl_2$), mercury/mercuric sulfate ($Hg/Hg_2SO_4$), copper/copper sulfate ($Cu/CuSO_4$) or the like. In addition, the reference electrode 20 may include all electrodes formed of a material having a possibility that the reference potential may be changed due to a change occurring in the concentration of ions.

According to one embodiment, the current-voltage graph obtaining unit 110 may apply a voltage to both ends of each of the operating electrode 10 and the reference electrode 20 at a first time point, and measure a current according to the applied voltage to obtain a first voltage-current graph, then apply a voltage to both ends of each of the operating electrode 10 and the reference electrode 20 at a second time point, and measure a current according to the applied voltage to obtain a second voltage-current graph. In this case, the first time point may be an initial time of use of the electrochemical sensor without a change in the reference potential of the reference electrode 20, and the second time point may be a time at which an event occurs or after a predetermined period of time has elapsed from the first time point according to a set cycle. The voltages applied at the first time point and the second time point are the same as each other, and may be a voltage that changes over time. For example, the voltage may be a linearly increasing voltage, a linearly increasing and then decreasing voltage, or a pulse voltage.

Specifically, the current-voltage graph obtaining unit 110 may obtain the first voltage-current graph and the second voltage-current graph using any one of linear sweep voltammetry, cyclic voltammetry, normal pulse voltammetry, differential pulse voltammetry and square wave voltammetry, and preferably differential pulse voltammetry or square wave voltammetry.

The potential correction unit 120 may determine a degree of change in the reference potential of the reference electrode 20 based on the obtained voltage-current graph, generate a reference potential correction signal based on the determined degree of change in the reference potential, and transmit it to the electrochemical sensor. For example, the potential correction unit 120 may extract feature values from the first voltage-current graph and the second voltage-current graph, and compare the extracted feature values to determine the degree of change in the reference potential. In addition, the potential correction unit 120 may generate a reference potential correction signal according to the determined degree of change in the reference potential and transmit it to the electrochemical sensor. The electrochemical sensor may receive the reference potential correction signal from the potential correction unit 120 and correct the voltage to be applied between the operating electrode 10 and the reference electrode 20 when measuring the target material according to the received reference potential correction signal. The feature value may include a voltage at a current peak point, a voltage at a start point of current increase, a voltage at a start point of current decrease, a voltage at a maximum rising gradient point, a voltage at a maximum falling gradient point and the like.

When the reference electrode 20 of the electrochemical sensor is formed of silver/silver chloride (Ag/AgCl), silver/silver chloride may react as shown in Equation 1 below.

[Equation 1]

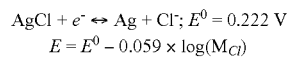

$$AgCl + e^- \leftrightarrow Ag + Cl^-; E^0 = 0.222 \text{ V}$$
$$E = E^0 - 0.059 \times \log(M_{Cl})$$

Wherein, E may be a reference potential of the reference electrode considering an effect of chlorine ions, $E^0$ may be a standard potential of the reference electrode, and $M_{Cl}$ may be a chemical activity, which is an effective concentration of chlorine ions inside the reference electrode.

When the reference electrode 20 includes an internal electrolyte, the concentration of the internal electrolyte may be decreased due to long-term exposure to cooling water or natural water, thereby causing a change in the reference potential. In addition, when the reference electrode 20 is in a paste state of silver/silver chloride which does not include the internal electrolyte, chlorine ions may be increased due to a reduction of silver chloride in the reference electrode 20, and the chlorine ions may be accumulated in the reference electrode 20, thereby causing a change in the reference potential. This change in the reference potential of the reference electrode 20 may provide an incorrect reference potential to cause a deterioration in the performance of the electrochemical sensor.

The reference potential correction apparatus 100 according to an exemplary embodiment may determine the degree of change in the reference potential of the reference electrode 20 using the voltammetry, generate a reference potential correction signal, and transmit it to the electrochemical sensor so that the electrochemical sensor corrects the voltage to be applied between the operating electrode 10 and the reference electrode 20 when measuring the target material.

Figure 2A:
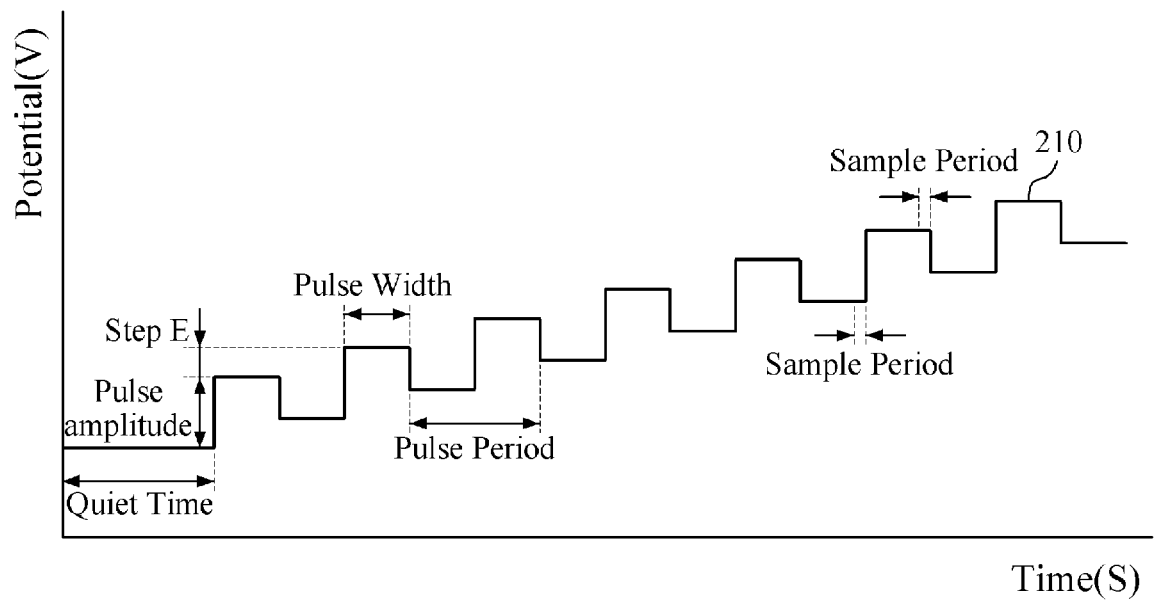
FIGS. 2A and 2B are diagrams for describing a process of correcting the reference potential using differential pulse voltammetry according to an exemplary embodiment.
Figure 2B:
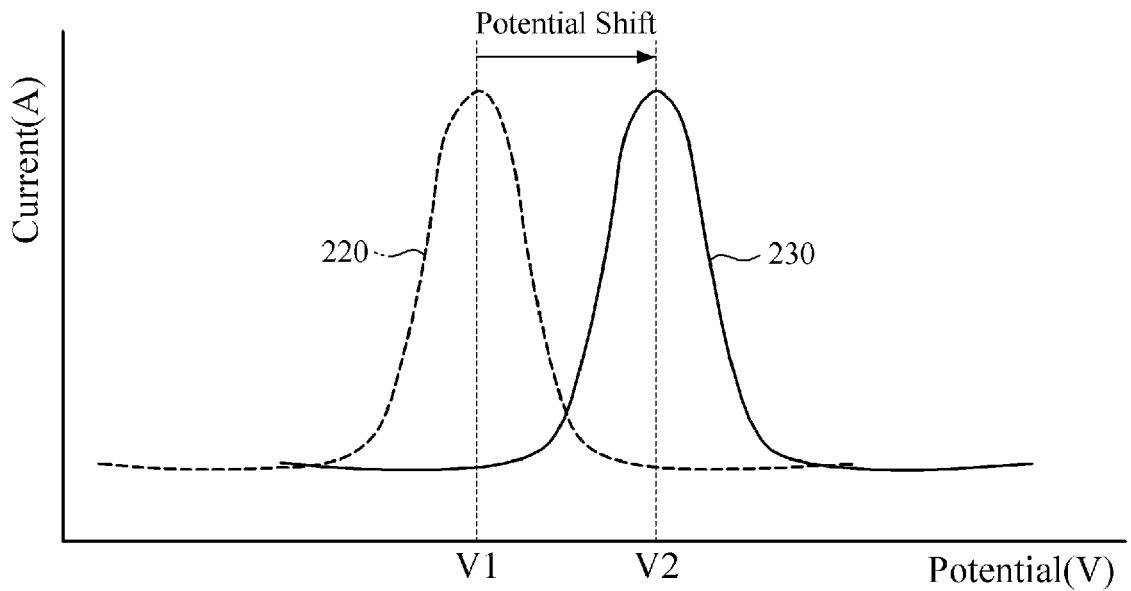

FIGS. 2A and 2B are diagrams for describing a process of correcting the reference potential using differential pulse voltammetry according to an exemplary embodiment. Specifically, FIG. 2A is an exemplary diagram of a voltage applied to both ends of each of the operating electrode and the reference electrode, and FIG. 2B is an exemplary diagram of the voltage-current graph measured when the voltage of FIG. 2A is applied.

Referring to FIGS. 1, 2A and 2B, the current-voltage graph obtaining unit 110 may apply a pulse voltage 210 to both ends of each of the operating electrode 10 and the reference electrode 20 according to the differential pulse voltammetry at the first time point, which is the initial point of use of the electrochemical sensor, to obtain a first voltage-current graph 220. In addition, the current-voltage graph obtaining unit 110 may apply a pulse voltage 210, which is equal to the voltage applied according to the differential pulse voltammetry at the first time point, to both ends of each of the operating electrode 10 and the reference electrode 20 at a second time point after a predetermined period of time has elapsed from the first time point to obtain a second voltage-current graph 230. In this case, the applied voltage 210 may be a pulse voltage in which the bottom voltage of each pulse is steadily increased. A pulse amplitude of each pulse may be 10 to 100 mV, a pulse width of each pulse may be 1 to 100 ms, and a pulse period between the pulses may be 0.1 to 5 s.

For example, the current-voltage graph obtaining unit 110 may apply the pulse voltage 210 at the first time point, measure currents before the start of each pulse and before the end of each pulse, and schematize the difference between the measured currents with respect to the bottom voltage of the pulse to obtain the first voltage-current graph 220. In addition, the current-voltage graph obtaining unit 110 may obtain the second voltage-current graph 230 at the second time point in the same manner as described above.

The potential correction unit 120 may extract a first voltage V1 at the current peak point from the first voltage-current graph 220 and extract a second voltage V2 at the current peak point from the second voltage-current graph 230 to compare the extracted voltages V1 and V2.

A change in the voltage at the current peak point indicates a change in the reference potential, and specifically, an increase in the voltage at the current peak point may indicate a decrease in the reference potential. Accordingly, the potential correction unit 120 may determine a difference (V2−V1) between the first voltage V1 and the second voltage V2 as the degree of change in the reference potential, generate a reference potential correction signal according thereto, and transmit it to the electrochemical sensor. The electrochemical sensor may correct the change in the reference potential by adding the difference (V2−V1) between the first voltage V1 and the second voltage V2 to the voltage to be applied between the operating electrode 10 and the reference electrode 20 when measuring the target material.

Figure 3A:
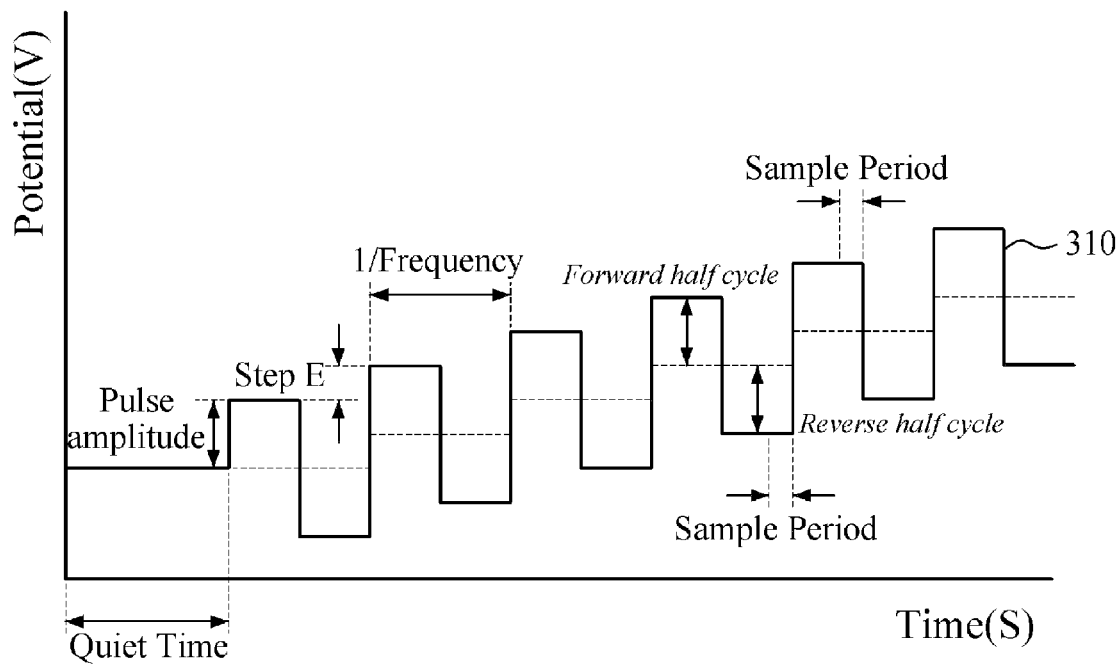
FIGS. 3A and 3B are diagrams for describing a process of correcting the reference potential using square wave voltammetry according to an exemplary embodiment.
Figure 3B:
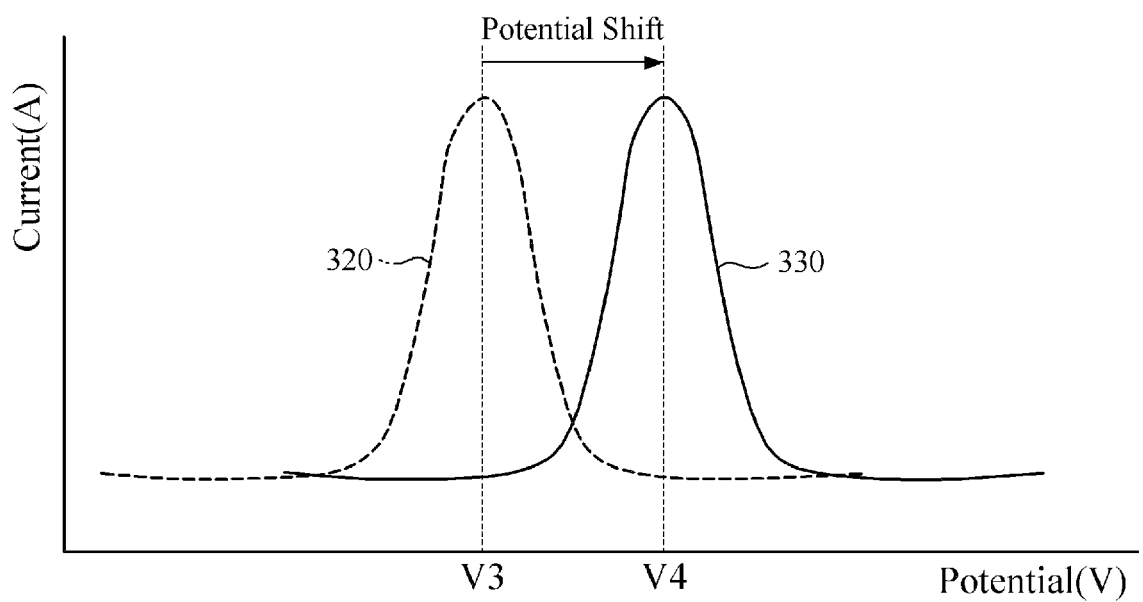

FIGS. 3A and 3B are diagrams for describing a process of correcting the reference potential using square wave voltammetry according to an exemplary embodiment. Specifically, FIG. 3A is an exemplary diagram of a voltage applied to both ends of each of the operating electrode and the reference electrode, and FIG. 3B is an exemplary diagram of the voltage-current graph measured when the voltage of FIG. 3A is applied.

Referring to FIGS. 1, 3A and 3B, the current-voltage graph obtaining unit 110 may apply a pulse voltage 310 to both ends of each of the operating electrode 10 and the reference electrode 20 at a first time point and a second time point according to the square wave voltammetry to obtain a first voltage-current graph 320 and a second voltage-current graph 330. In this case, the applied pulse voltage 310 has a form in which a forward pulse and a reverse pulse are combined, and one cycle pulse may be composed of a combination of the forward pulse and the reverse pulse. Each pulse may have an amplitude of 5 to 25 mV, and a frequency of about 250 Hz.

For example, the current-voltage graph obtaining unit 110 may apply the pulse voltage 310 at the first time point, measure currents before the end of the forward pulse and before the end of the reverse pulse, and schematize the difference between the measured currents with respect to the applied voltage to obtain the first voltage-current graph 320. In addition, the current-voltage graph obtaining unit 110 may obtain the second voltage-current graph 330 at the second time point in the same manner as described above.

The potential correction unit 120 may extract a first voltage V3 at the current peak point from the first voltage-current graph 320 and extract a second voltage V4 at the current peak point from the second voltage-current graph 330 to compare the extracted voltages V3 and V4. The potential correction unit 120 may generate a reference potential correction signal based on a difference (V4−V3) between the first voltage V3 and the second voltage V4, and transmit it to the electrochemical sensor. The electrochemical sensor may correct the change in the reference potential by adding the difference (V4−V3) between the first voltage V3 and the second voltage V4 to the voltage to be applied between the operating electrode 10 and the reference electrode 20 when measuring the target material.

Figure 4A:
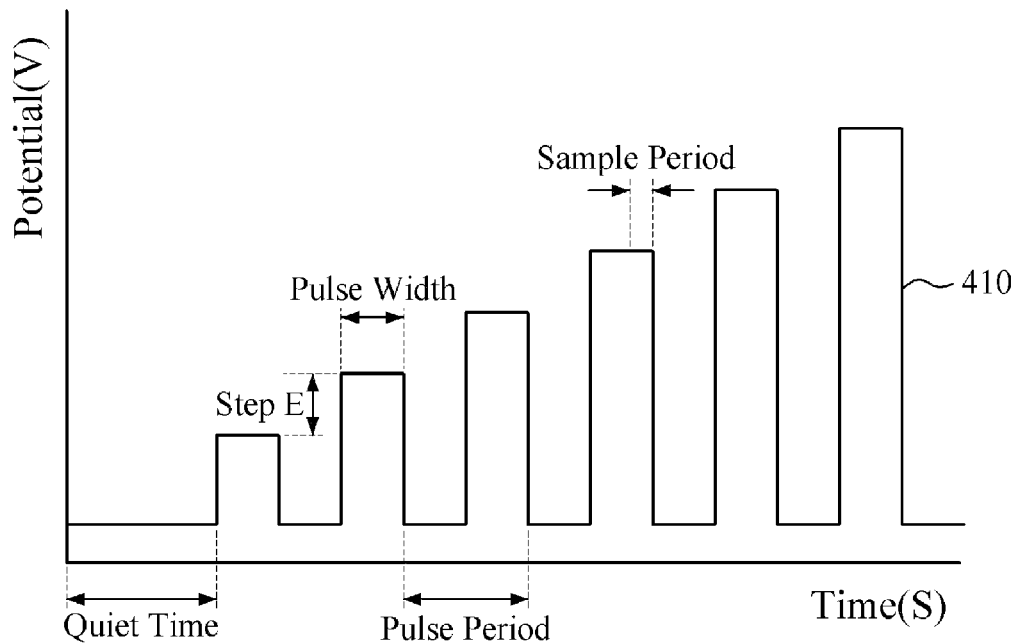
FIGS. 4A and 4B are diagrams for describing a process of correcting the reference potential using normal pulse voltammetry according to an exemplary embodiment.
Figure 4B:
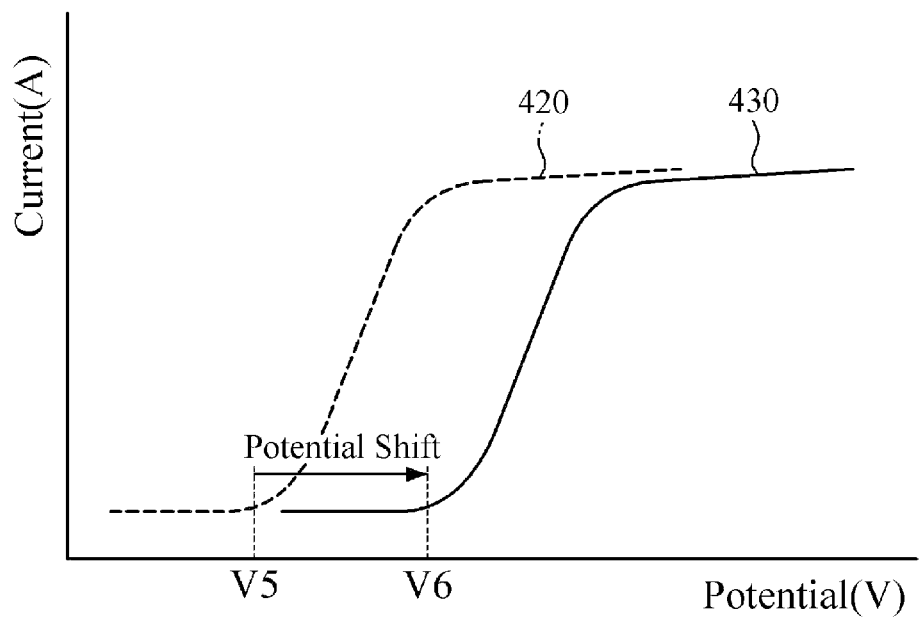

FIGS. 4A and 4B are diagrams for describing a process of correcting the reference potential using normal pulse voltammetry according to an exemplary embodiment. Specifically, FIG. 4A is an exemplary diagram of a voltage applied to both ends of each of the operating electrode and the reference electrode, and FIG. 4B is an exemplary diagram of the voltage-current graph measured when the voltage of FIG. 4A is applied.

Referring to FIGS. 1, 4A and 4B, the current-voltage graph obtaining unit 110 may apply a pulse voltage 410 to both ends of each of the operating electrode 10 and the reference electrode 20 at a first time point and a second time point according to the normal pulse voltammetry to obtain a first voltage-current graph 420 and a second voltage-current graph 430. In this case, the applied voltage 410 may be a pulse voltage in which the voltage of each pulse is steadily increased. The pulse width of each pulse may be 1 to 100 ms, and the pulse period between the pulses may be 0.1 to 5 s.

For example, the current-voltage graph obtaining unit 110 may apply the pulse voltage 410 at the first time point, measure currents before the end of each pulse, and schematize the measured current with respect to the applied voltage to obtain the first voltage-current graph 420. In addition, the current-voltage graph obtaining unit 110 may obtain the second voltage-current graph 430 at the second time point in the same manner as described above.

The potential correction unit 120 may extract a first voltage V5 at the start point of current increase from the first voltage-current graph 420 and extract a second voltage V6 at the start point of current increase from the second voltage-current graph 230 to compare the extracted voltages V5 and V6. The potential correction unit 120 may generate a reference potential correction signal based on a difference (V6−V5) between the first voltage V5 and the second voltage V6, and transmit it to the electrochemical sensor. The electrochemical sensor may correct the change in the reference potential by adding the difference (V6−V5) between the first voltage V5 and the second voltage V6 to the voltage to be applied between the operating electrode 10 and the reference electrode 20 when measuring the target material.

Figure 5A:
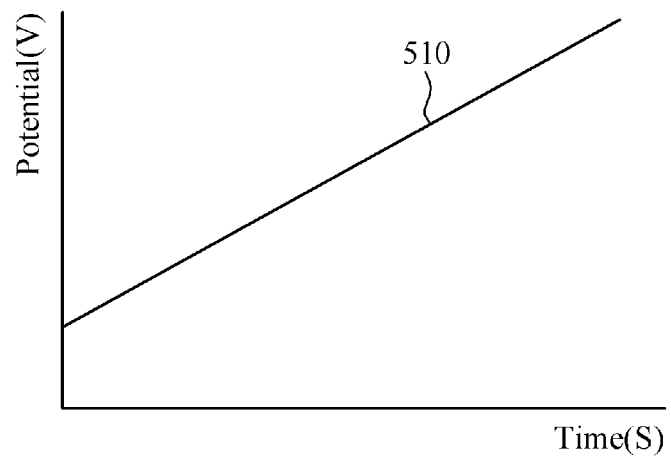
FIGS. 5A and 5B are diagrams for describing a process of correcting the reference potential using linear sweep voltammetry according to an exemplary embodiment.
Figure 5B:
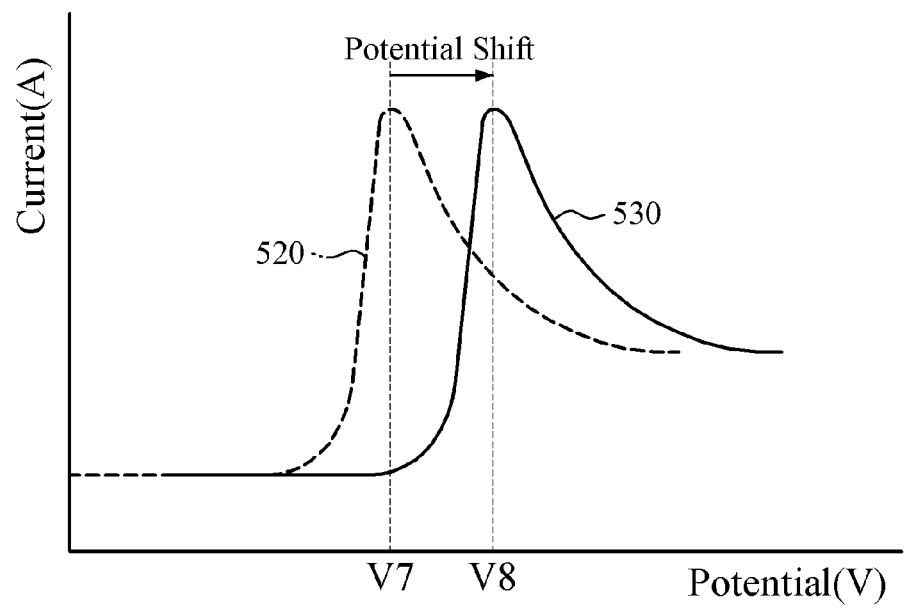

FIGS. 5A and 5B are diagrams for describing a process of correcting the reference potential using linear sweep voltammetry according to an exemplary embodiment. Specifically, FIG. 5A is an exemplary diagram of a voltage applied to both ends of each of the operating electrode and the reference electrode, and FIG. 5B is an exemplary diagram of the voltage-current graph measured when the voltage of FIG. 5A is applied.

Referring to FIGS. 1, 5A and 5B, the current-voltage graph obtaining unit 110 may apply a voltage 510 which is linearly increased or decreased at a first time point and a second time point according to the linear sweep voltammetry to both ends of each of the operating electrode 10 and the reference electrode 20 to obtain a first voltage-current graph 520 and a second voltage-current graph 530.

For example, the current-voltage graph obtaining unit 110 may measure a current by applying the voltage 510 which is linearly increased or decreased at the first time point, and schematize the measured current with respect to the applied voltage to obtain the first voltage-current graph 520. In addition, the current-voltage graph obtaining unit 110 may obtain the second voltage-current graph 530 at the second time point in the same manner as described above.

The potential correction unit 120 may extract a first voltage V7 at the current peak point from the first voltage-current graph 520, extract a second voltage V8 at the current peak point from the second voltage-current graph 530 to compare the extracted voltages V7 and V8. The potential correction unit 120 may generate a reference potential correction signal based on a difference (V8−V7) between the first voltage V7 and the second voltage V8, and transmit it to the electrochemical sensor. The electrochemical sensor may correct the change in the reference potential by adding the difference (V8−V7) between the first voltage V7 and the second voltage V8 to the voltage to be applied between the operating electrode 10 and the reference electrode 20 when measuring the target material.

Meanwhile, the cyclic voltammetry may also be performed in the same manner as the linear sweep voltammetry.

Figure 6:
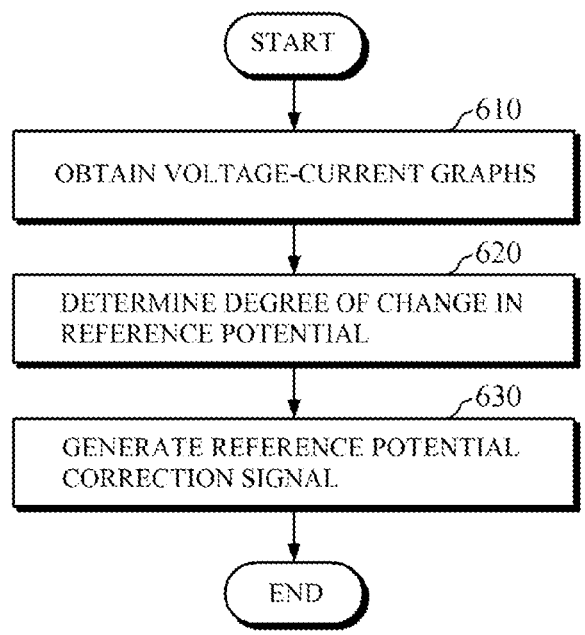
FIG. 6 is a flow chart illustrating a method for correcting a reference potential according to an exemplary embodiment.

FIG. 6 is a flow chart illustrating a method for correcting a reference potential according to an exemplary embodiment.

The method for correcting a reference potential of FIG. 6 may be performed by the reference potential correction apparatus 100 of FIG. 1.

Referring to FIG. 6, the apparatus for correcting a reference potential may apply a voltage to both ends of each of the operating electrode and the reference electrode of the electrochemical sensor to obtain voltage-current graphs (610).

According to one embodiment, the reference potential correction apparatus may apply a voltage to both ends of each of the operating electrode and the reference electrode at a first time point, and measure a current according to the applied voltage to obtain a first voltage-current graph, then apply a voltage to both ends of each of the operating electrode and the reference electrode at a second time point, and measure a current according to the applied voltage to obtain a second voltage-current graph. In this case, the first time point may be an initial time of use of the electrochemical sensor without a change in the reference potential of the reference electrode, and the second time point may be a time at which an event occurs or after a predetermined period of time has elapsed from the first time point according to a set cycle. The voltages applied at the first time point and the second time point are the same as each other, and may be a voltage that changes over time. For example, the voltage may be a linearly increasing voltage, a linearly increasing and then decreasing voltage, or a pulse voltage.

For example, the reference potential correction apparatus may obtain the first voltage-current graph and the second voltage-current graph using any one of linear sweep voltammetry, cyclic voltammetry, normal pulse voltammetry, differential pulse voltammetry and square wave voltammetry, and preferably differential pulse voltammetry or square wave voltammetry.

The reference potential correction apparatus may determine a degree of change in the reference potential of the reference electrode based on the obtained voltage-current graph (620). For example, the reference potential correction apparatus may extract feature values from the first voltage-current graph and the second voltage-current graph, and compare the extracted feature values to determine the degree of change in the reference potential. Here, the feature value may include the voltage at a current peak point, the voltage at the start point of the current increase, the voltage at the start point of the current decrease, the voltage at the maximum rising gradient point, the voltage at the maximum falling gradient point and the like.

The reference potential correction apparatus may generate a reference potential correction signal according to the determined degree of change in the reference potential, and transmit it to the electrochemical sensor (630). The electrochemical sensor may receive the reference potential correction signal from the reference potential correction apparatus and correct the voltage to be applied between the operating electrode and the reference electrode when measuring the target material according to the received reference potential correction signal.

Figure 7:
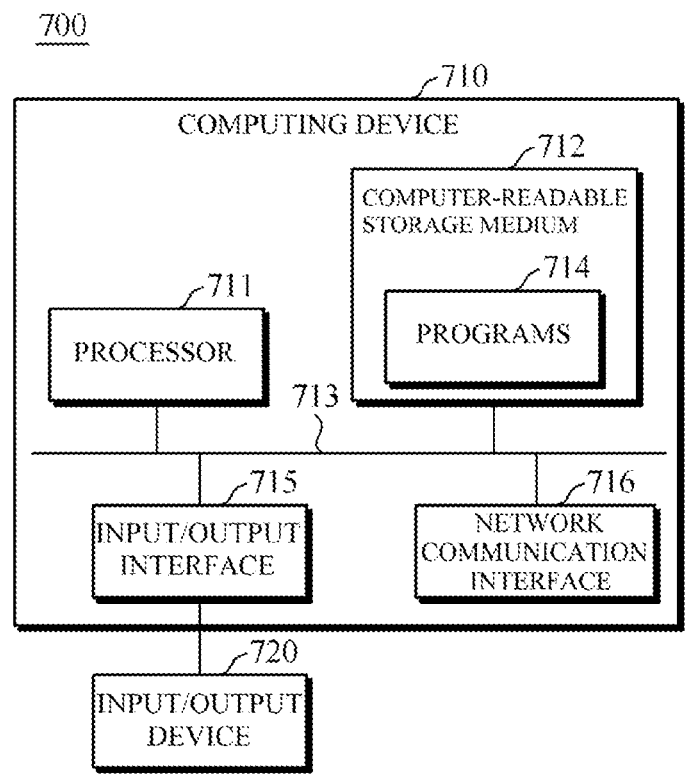
FIG. 7 is a block diagram describing by exemplifying a computing environment including a computing device suitable for use in exemplary embodiments.

FIG. 7 is a block diagram describing by exemplifying a computing environment including a computing device suitable for use in exemplary embodiments. In the illustrated embodiment, the respective configuration units may have different functions and capabilities other than those described below, and the computing environment may also include additional configuration units other than those described below.

An illustrated computing environment 700 may include a computing device 710. According to one embodiment, the computing device 710 may include, for example, one or more configuration units included in the reference potential correction apparatus 100, such as the current-voltage graph obtaining unit 110 and the potential correction unit 120 shown in FIG. 1.

The computing device 710 may include at least one processor 711, a computer-readable storage medium 712, and a communication bus 713. The processor 711 may cause the computing device 710 to operate according to the above-described exemplary embodiments. For example, the processor 711 may execute one or more programs 714 stored in the computer-readable storage medium 712. The one or more programs 714 may include one or more computer-executable instructions. When executed by the processor 711, the computer-executable instructions may be configured to cause the computing device 710 to perform operations according to the exemplary embodiments.

The computer-readable storage medium 712 may store computer-executable instructions or program code, program data, and/or other suitable type of information. The program 714 stored in the computer-readable storage medium 712 may include a set of instructions executable by the processor 711. According to one embodiment, the computer-readable storage medium 712 may be a memory (a volatile memory, such as a random access memory, a non-volatile memory, or a suitable combination thereof), one or more magnetic disk storage devices, optical disk storage devices, flash memory, other types of storage medium accessed by the computing device 710 and capable of storing desired information, or a suitable combination thereof.

The communication bus 713 may connect various other configuration units of the computing device 710 including the processor 711 and the computer-readable storage medium 712 with each other.

The computing device 710 may also include one or more input/output interfaces 715 and one or more network communication interfaces 716, which provide interfaces for one or more input/output devices 720. The input/output interface 715 and the network communication interface 716 may be connected to the communication bus 713. The input/output device 720 may be connected to other configuration units of the computing device 710 through the input/output interface 715. The input/output device 720 may include, for example, a pointing device (such as a mouse or trackpad), a keyboard, a touch input device (such as a touchpad or a touchscreen), a voice or sound input device, various types of sensor devices, and/or input devices such as a photographing device, and/or output devices such as a display device, printer, speakers and/or network card. The input/output device 720 may be included in the computing device 710 as one configuration unit constituting the computing device 710 or may be connected to the computing device 710 as a separate device distinct from the computing device 710.

The above-described embodiments of the present invention may be implemented as a computer-readable code in a computer-readable recording medium. The computer-readable recording medium may include all types of recording devices for storing data that can be read by a computer system. Examples of computer-readable recording medium may include ROM, RAM, CD-ROM, magnetic tape, floppy disk, optical disk and the like. Further, the computer-readable recording medium may be distributed over a computer system connected by a network, and written and implemented in computer-readable code that n be read by the computer in a distributed manner.

The present invention has been described with reference to the preferred embodiments above, and it will be understood by those skilled in the art that various modifications may be made within the scope without departing from essential characteristics of the present invention. Accordingly, it should be interpreted that the scope of the present invention is not limited to the above-described embodiments, and other various embodiments within the scope equivalent to those described in the claims are included within the present invention.

What is claimed is:

1. An apparatus for correcting a reference potential for an electrochemical sensor, the apparatus comprising:
   a current-voltage graph obtainer configured to apply a voltage to an electrical connector end of each of an operating electrode and a reference electrode of an electrochemical sensor at a first time point and a second time point to obtain a first voltage-current graph and a second voltage-current graph; and
   a potential corrector configured to determine a degree of change in the reference potential of the reference electrode based on the first voltage-current graph and the second voltage-current graph.

2. The apparatus according to claim 1, wherein the first time point is an initial time of use of the electrochemical sensor without a change in the reference potential, and the second time point is a time point after a predetermined period of time has elapsed from the first time point.

3. The apparatus according to claim 1, wherein the current-voltage graph obtainer obtains the first voltage-current graph and the second voltage-current graph using any one of linear sweep voltammetry, cyclic voltammetry, normal pulse voltammetry, differential pulse voltammetry and square wave voltammetry.

4. The apparatus according to claim 1, wherein the potential corrector extracts feature values from the first voltage-current graph and the second voltage-current graph, and compares the extracted feature values to determine the degree of change in the reference potential.

5. The apparatus according to claim 4, wherein the feature value includes a voltage at a current peak point, a voltage at a start point of current increase, a voltage at a start point of current decrease, a voltage at a maximum rising gradient point, and a voltage at a maximum falling gradient point.

6. The apparatus according to claim 4, wherein the potential corrector determines a difference between the feature value extracted from the first voltage-current graph and the feature value extracted from the second voltage-current graph as the degree of change in the reference potential.

7. The apparatus according to claim 1, wherein the potential corrector generates a reference potential correction signal according to the determined degree of change in the reference potential, and transmits it to the electrochemical sensor.

8. An electrochemical sensor comprising the apparatus according to claim 1.

9. A method for correcting a reference potential of an electrochemical sensor, the method comprising:
   applying a voltage to an electrical connector end of each of an operating electrode and a reference electrode of an electrochemical sensor at a first time point and a second time point to obtain a first voltage-current graph and a second voltage-current graph; and
   determining a degree of change in the reference potential of the reference electrode based on the first voltage-current graph and the second voltage-current graph.

10. The method according to claim 9, wherein the first time point is an initial time of use of the electrochemical sensor without a change in the reference potential, and the second time point is a time point after a predetermined period of time has elapsed from the first time point.

11. The method according to claim 9, wherein the step of obtaining the first voltage-current graph and the second voltage-current graph obtains the first voltage-current graph and the second voltage-current graph using any one of linear sweep voltammetry, cyclic voltammetry, normal pulse voltammetry, differential pulse voltammetry and square wave voltammetry.

12. The method according to claim 9, wherein the step of determining the degree of change in the reference potential extracts feature values from the first voltage-current graph and the second voltage-current graph, and compares the extracted feature values to determine the degree of change in the reference potential.

13. The method according to claim 12, wherein the feature value includes a voltage at a current peak point, a voltage at a start point of current increase, a voltage at a start point of current decrease, a voltage at a maximum rising gradient point, and a voltage at a maximum falling gradient point.

14. The method according to claim 13, wherein the step of determining the degree of change in the reference potential determines a difference between the feature value extracted from the first voltage-current graph and the feature value extracted from the second voltage-current graph as the degree of change in the reference potential.

15. The method according to claim 9, further comprising generating a reference potential correction signal according to the determined degree of change in the reference potential, and transmitting it to the electrochemical sensor.

* * * * *